United States Patent [19]
Adamson

[11] 3,826,371
[45] July 30, 1974

[54] AQUARIUM CLEANING DEVICE

[76] Inventor: James L. Adamson, 120 Calle Marguerita, Los Gatos, Calif. 95030

[22] Filed: Dec. 21, 1972

[21] Appl. No.: 317,173

[52] U.S. Cl.................................. 210/169, 15/1.7
[51] Int. Cl............................................. E04h 3/20
[58] Field of Search........ 210/169, 197, 238; 119/3, 119/5; 15/1.7

[56] References Cited
UNITED STATES PATENTS

| | | | |
|---|---|---|---|
| 2,665,250 | 1/1954 | Willinger et al. | 210/169 |
| 2,899,063 | 8/1959 | Ellis, Jr. | 210/169 |
| 3,630,364 | 12/1971 | Johnson | 210/169 |
| 3,734,853 | 5/1973 | Harrath | 210/169 |

*Primary Examiner*—Theodore A. Granger
*Attorney, Agent, or Firm*—Jack M. Wiseman

[57] ABSTRACT

An aquarium cleaning device comprising a withdrawing tube for removing water along with debris and foreign matter from an aquarium and advancing the removed water into a filter. Openings in the bottom of the filter enable the filtered water to return to the aquarium. The withdrawing tube has a reduced diameter inlet opening disposed in the aquarium for increasing the speed of the withdrawal of water with debris and foreign matter into the withdrawing tube. Air is supplied to the withdrawing tube for the removing of water with debris and foreign matter from the aquarium and for advancing the removed water through the withdrawing tube into the filter. Spaced from and above the inlet opening, the withdrawing tube includes an increased diameter portion or a deceleration chamber to cause sand and objects of greater density advancing from the inlet opening of the withdrawing tube to fall back into the aquarium through openings in the wall thereof rather than advance to the filter.

16 Claims, 5 Drawing Figures

PATENTED JUL 30 1974

AQUARIUM CLEANING DEVICE

BACKGROUND OF THE INVENTION

The present invention relates in general to aquariums, and more particularly to a device for removing debris and foreign matter from an aquarium.

Heretofore, water with debris and foreign matter was removed from an aquarium through a tube and advanced through a filter. The filtered water was returned to the aquarium. Various systems have been employed for the removal of water, such as flexible bulbs and air lifts. To avoid removing sand with the water and advancing the sand into the filter, the inlet end of the withdrawing tube was relatively large. The speed at which water was drawn into the inlet end of the withdrawing tube was rather slow and the cleaning operation was too time consuming.

SUMMARY OF THE INVENTION

A device for cleaning an aquarium in which a withdrawing tube removes water with debris and foreign matter from the aquarium tank into a filter. The inlet opening of the withdrawing tube is of a reduced diameter to increase the speed at which water with debris and foreign matter is drawn into the withdrawing tube. Spaced from and above the inlet opening is an increased diameter portion of the withdrawing tube which causes sand and objects of greater density advancing from the inlet opening of the withdrawing tube to fall back into the aquarium tank through openings in the wall of the increased diameter portion of the withdrawing tube.

By virtue of the present invention, less time is consumed for the cleaning of the water in an aquarium and the use of the filter is not impaired by sand gathering therein.

DETAILED DESCRIPTION OF THE PREFERRED EMBODIMENT

Figure 1:
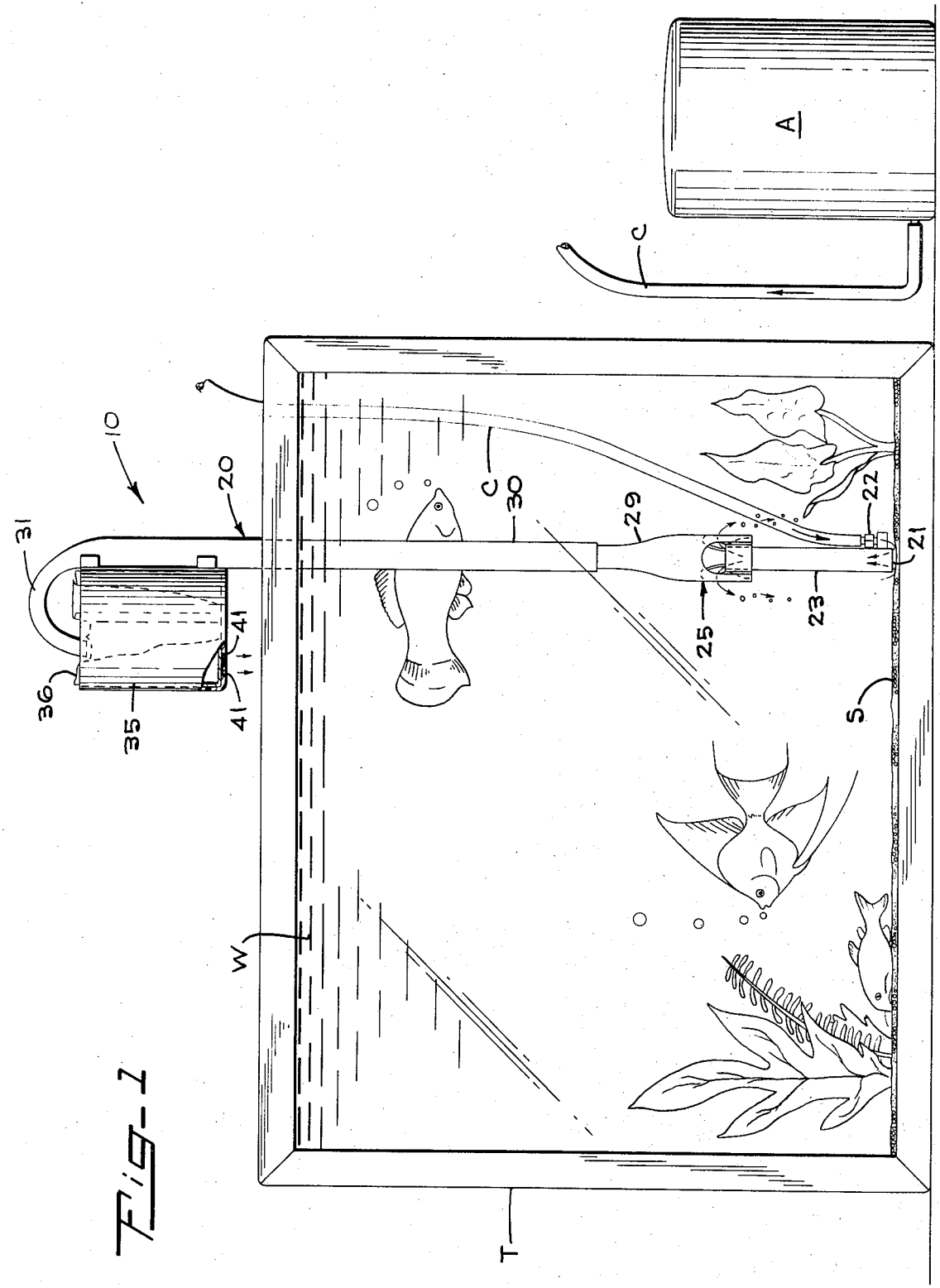
FIG. 1 is a side elevation view of the device of the present invention for cleaning the water of an aquarium illustrated in conjunction with an aquarium and a source of air.
Figure 2:
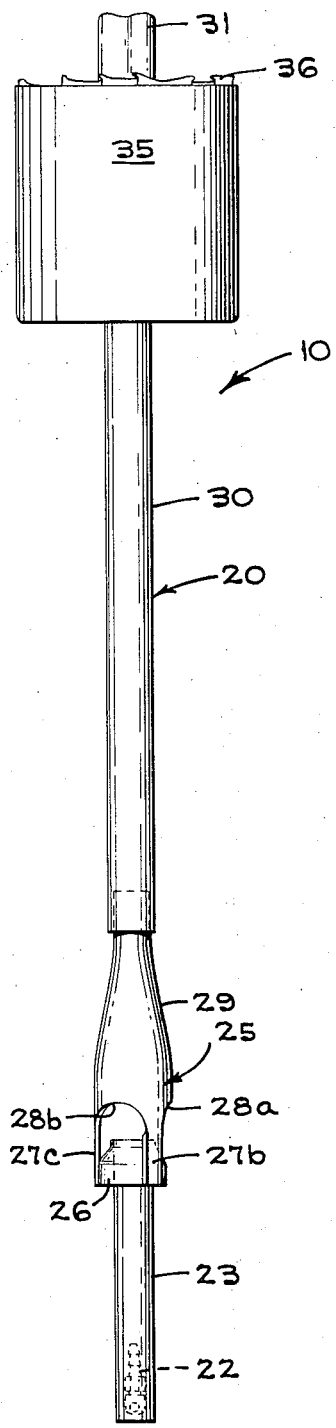
FIG. 2 is a front elevation view of the device shown in FIG. 1.
Figure 3:
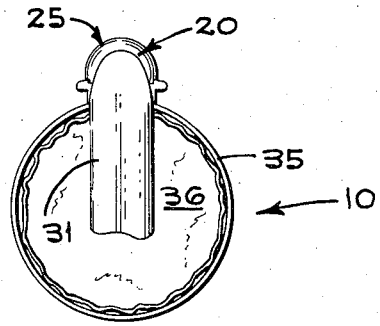
FIG. 3 is a top view of the device shown in FIG. 1.
Figure 4:
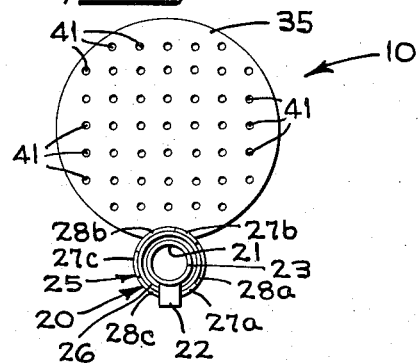
FIG. 4 is a bottom view of the device shown in FIG. 1.
Figure 5:
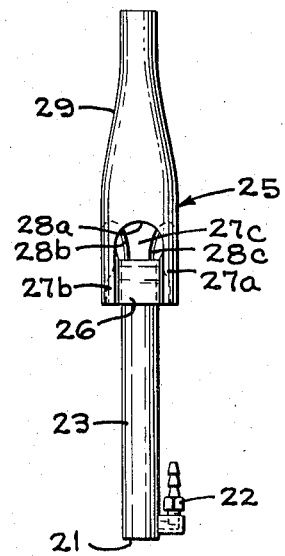
FIG. 5 is an enlarged elevation view of a section of a withdrawing tube of the device shown in FIG. 1 having an increased diameter portion for causing sand to fall back into the aquarium without advancing into a filter and having a reduced diameter inlet opening for increasing the speed at which water advances into the withdrawing tube.

Illustrated in FIG. 1 is a conventional aquarium tank T with sand S at the bottom thereof, and with water W contained by the tank T. For removing debris and foreign matter from the water W of the tank T, an aquarium cleaning device 10 embodying the present invention is manually held in the position shown in FIG. 1 and is manually moved about the tank T.

The device 10 comprises a withdrawing tube 20 made of suitable plastic material. In the exemplary embodiment, the plastic from which the tube 20 is made is rigid and transparent. At the lower end thereof, the withdrawing tube 20 is formed with a reduced diameter inlet section 23 with an inlet opening 21 of a size diameter for receiving water W at a relatively high speed. The inlet section 23 preferably has a cylindrical or tubular configuration. In the exemplary embodiment, the diameter of the inlet opening 21 of the inlet section 23 is three-eighths inch. Adjacent to the inlet opening 21 is a suitable connector 22, whereby air may be conducted into the withdrawing tube 20 for withdrawing water W from the tank T and advancing the withdrawn water W upwardly through the tube 20. In the exemplary embodiment, the lower cylindrical section 23 of the withdrawing tube 20 having the inlet opening 21 formed at the lower end thereof has a length of 4 inches.

A suitable source of air A is disposed outside of the aquarium tank T and is connected to the connector 22 of the withdrawing tube 20 by a suitable conduit C. The pressure of the source of air A is sufficient to conduct air into the inlet section 23.

The withdrawing tube 20 includes an increased diameter section or deceleration chamber 25, which is connected to the inlet section 23 by an inner wall conical connector 26. The upper end of the inlet section 23 is telescopically received by the conical connector 26. Surrounding the conical connector 26 is an outer wall for the increased diameter section 25 having legs 27a, 27b, 27c, which define arch-shaped openings therebetween 28a, 28b, 28c. The upper end of the increased diameter section 25 is cylindrical and tapers outwardly and downwardly into a conically shaped portion 29.

Air enters the withdrawing tube 20 through the connector 22 causing the air to lift water W from the tank T through the inlet section 23 and up through the increased diameter section 25. The diameter of the increased diameter section 25 at the lower portion thereof is of a size to provide a deceleration chamber in which the lifting force is reduced. As a consequence thereof, sand or objects of greater density flowing with the water W will drop back into the tank T through the arch-shaped openings 28a–28c that are radially spaced from the tapered inner wall of the connector 26. In the exemplary embodiment, the diameter of the increased diameter section 25 at the legs 27a–27c is 1 inch and the length of the increased diameter section 25 is 4⅛ inches. The tapered portion 29 serves to smooth out the flow of air through the increased diameter section 25.

An upper cylindrical section 30 is connected to the top of the increased diameter section 25 and extends upwardly into an elbow section 31. Water W without sand is lifted by the air from the enlarged diameter section 25 into the upper section 30. Mounted on the upper section 30 is a suitable filter 35 with a supply of filter tissue 36 therein. Water W discharged from the outlet end of the upper section 31 passes through the filter 35.

At the bottom of the filter 35 are perforations 41 formed on the bottom wall of the filter 35 to enable filtered water to return to the tank T.

I claim:

1. A device for cleaning an aquarium comprising:
   a. a filter;
   b. a withdrawing tube communicating with said filter for removing water from an aquarium tank and for discharging the water into said filter for cleaning the water, c. said withdrawing tube comprising an inlet section of reduced diameter with a lower end for receiving water in the aquarium tank and with an upper end for discharging water within the withdrawing tube; and d. means communicating with said lower end of said inlet section of said withdrawing tube for supplying air into said inlet section for lifting water from the aquarium tank through said withdrawing tube for discharge into said filter, e. said withdrawing tube comprising an increased diameter section telescopically receiving the upper end of said inlet section, said increased diameter section of said withdrawing tube including an inner wall for connecting said increased diameter section to said upper end of said inlet section and an outer wall radially spaced from said upper end of said inlet section by axially extending legs angularly spaced apart defining openings for discharging matter of a density above a desired amount into the aquarium tank before such matter is discharged into the filter.

2. A tube for withdrawing water from an aquarium tank for cleaning comprising:

a. an inlet section of reduced diameter with a lower end for receiving water in the aquarium tank and with an upper end for discharging water within the tube, said inlet section including a connector at its lower end for supplying air into said inlet section to advance water through the tube;

b. an increased diameter section telescopically receiving said upper end of said inlet section, said increased diameter section including an inner wall for connecting said increased diameter section to said upper end of said inlet section and an outer wall radially spaced from said upper end of said inlet section by axially extending legs angularly spaced apart defining openings for discharging matter of a density above a desired amount; and c. a section connected to said increased diameter section for discharging water advancing through the tube.

3. A device as claimed in claim 2 wherein said increased diameter section is tapered above said openings to smooth out the flow of air through said increased diameter section.

4. A tube as claimed in claim 2 wherein said increased diameter section is tapered above said openings to smooth out the flow of air through said increased diameter section.

5. A device for cleaning an aquarium comprising:
a. a filter;
b. a withdrawing tube communicating with said filter for removing water from an aquarium tank and for discharging the water into said filter for cleaning the water,
c. said withdrawing tube comprising an inlet section of reduced diameter with a lower end for receiving water in the aquarium tank and with an upper end for discharging water within the tube; and
d. means communicating with said lower end of said inlet section of said withdrawing tube for supplying air into said inlet section for lifting water from the aquarium tank through said withdrawing tube for discharge into said filter, e. said withdrawing tube comprising an increased diameter section communicating with said upper end of said inlet section for the discharge of water thereinto, said increased diameter section including means for connecting said increased diameter section to said upper end of said inlet section and an outer wall radially spaced from said upper end of said inlet section, said increased diameter section being formed with openings adjacent to the connection between said increased diameter section and said upper end of said inlet section for discharging into the aquarium tank matter in the water discharged from the inlet section of a density above a desired amount before such water is discharged into the filter.

6. A device as claimed in claim 5 wherein said upper end of said inlet section is telescopically received by said increased diameter section.

7. A device as claimed in claim 6 wherein said openings in said increased diameter section are defined by axially extending sections in said outer wall angularly spaced apart.

8. A device as claimed in claim 7 wherein said means connecting said increased diameter section to said upper end of said inlet section is an inner wall.

9. A device as claimed in claim 8 wherein said increased diameter section is tapered above said openings to smooth out the flow of air through said increased diameter section.

10. A device as claimed in claim 9 wherein said filter is supported by said withdrawing tube.

11. A device as claimed in claim 10 and comprising means on said filter for returning filtered water to the aquarium tank.

12. A tube for withdrawing water from an aquarium tank for cleaning comprising:
a. an inlet section of reduced diameter with a lower end for receiving water in the aquarium tank and with an upper end for discharging water within the tube, said inlet section including a connector for supplying air into said inlet section to advance water through the tube; and
b. an increased diameter section communicating with the upper end of said inlet section, said increased diameter section including means connected to the upper end of said inlet section and an outer wall radially spaced from the upper end of said inlet section, said increased diameter section being formed with openings adjacent to the connection between said increased diameter section and the upper end of said inlet section for discharging matter in the advancing water of a density greater than a desired amount; and
c. a section connected to said increased diameter section for discharging water advancing through the tube.

13. A tube as claimed in claim 12 wherein the upper end of said inlet section is telescopically received by said increased diameter section.

14. A tube as claimed in claim 13 wherein said openings formed in said increased diameter section are defined by axially extending sections in said outer wall angularly spaced apart.

15. A tube as claimed in claim 14 wherein said means connecting said increased diameter section to the upper end of said inlet section is an inner wall.

16. A device as claimed in claim 15 wherein said increased diameter section is tapered above said openings to smooth out the flow of air through said increased diameter section.

* * * * *